(12) United States Patent
Rutledge

(10) Patent No.: US 6,205,321 B1
(45) Date of Patent: *Mar. 20, 2001

(54) PAGER HAVING VOICE SYNTHESIS CAPABILITY AND METHOD FOR USING THE SAME

(75) Inventor: Christopher L. Rutledge, Somerset, NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,914

(22) Filed: Jan. 2, 1997

(51) Int. Cl.[7] .................................................. H04Q 7/10
(52) U.S. Cl. ...................... 455/31.2; 455/31.3; 455/412; 455/458
(58) Field of Search .................................. 455/31.2, 31.3, 455/412, 413, 414, 418, 419, 420, 426, 514, 515, 513, 458; 340/825.44

(56) References Cited

U.S. PATENT DOCUMENTS

| 4,479,124 | * | 10/1984 | Rodriguez et al. | 340/825.44 |
|---|---|---|---|---|
| 4,742,516 | * | 5/1988 | Yamaguchi | 370/94 |
| 4,873,520 | * | 10/1989 | Fisch et al. | 340/825.44 |
| 4,928,096 | * | 5/1990 | Leonardo et al. | 455/31.2 |
| 5,418,835 | * | 5/1995 | Frohman et al. | 379/57 |
| 5,444,438 | * | 8/1995 | Goldberg | 455/31.3 |
| 5,455,579 | * | 10/1995 | Bennett et al. | 455/412 |
| 5,463,382 | * | 10/1995 | Nikas et al. | 455/419 |
| 5,559,859 | * | 9/1996 | Dai et al. | 379/52 |
| 5,600,703 | * | 2/1997 | Dang et al. | 455/31.3 |
| 5,733,131 | * | 3/1998 | Park | 434/307 |
| 5,815,800 | * | 9/1998 | Su et al. | 455/31.3 |
| 5,881,365 | * | 3/1999 | Yang et al. | 455/45 |
| 5,892,457 | * | 4/1999 | Kim | 340/825.44 |

* cited by examiner

Primary Examiner—Daniel S. Hunter
Assistant Examiner—Thuan T. Nguyen
(74) Attorney, Agent, or Firm—Banner & Witcoff, Ltd.

(57) ABSTRACT

A method and system for retrieving pages from a remote location. In one embodiment, pager users can access their pagers from a remote location, via a public switched telephone network, to retrieve messages (i.e. numeric, alphanumeric and voice messages) and/or perform any other pager operation by engaging in an interactive wireless dialogue with the pager via a public switched telephone network and the paging system, wherein the pager uses digital voice encoding techniques to provide verbal feedback to the remote user. The remote can dial the number of the individual pager from a remote location and enter a preprogrammed command sequence to initiate wireless dialogue with the pager. Once the wireless dialogue is initiated, the remote user can enter other pre-programmed commands to control the operation of the pager from the remote location (e.g. to retrieve messages sent to the pager). The preprogrammed commands can be part of a command set such as a DTMF command set.

26 Claims, 2 Drawing Sheets

PAGER HAVING VOICE SYNTHESIS CAPABILITY AND METHOD FOR USING THE SAME

FIELD OF THE INVENTION

This invention relates to wireless communications systems, and more particularly to paging systems.

BACKGROUND OF THE INVENTION

Radio paging technology has advanced from the simple tone-only pager to the tone and voice pager, and most recently, to the numeric and alphanumeric display pagers. In a typical paging system that provides numeric and/or alphanumeric display paging, a central transmitter or paging terminal is used to generate the pages which are transmitted via a radio link to a number of paging receivers. The pages consist of a unique digitally encoded address of the particular pager to which each page is targeted, immediately followed by a corresponding digitally encoded numeric or alphanumeric page message which is intended for display on the target pager.

Typically, the numeric or alphanumeric page message is stored in a memory within the paging receiver for later recall and display by the pager user. In order for the pager subscriber or user to be able to retrieve the pages or messages sent to the pager, however, the user must carry the pager within tactile proximity to his or herself. That is, if the user is without the pager, then the user will be unable to operate the pager, and therefore unable to retrieve any of the messages received by the pager. As a result, there is a need to allow a pager user to operate the pager from a remote location, without having to carry any additional hardware, so that pages received by the pager can be accessed therefrom.

SUMMARY OF THE INVENTION

Accordingly, the present invention is directed to a method for remotely controlling the operation of a pager in a paging system so that any messages sent to the pager can be retrieved from a remote location. To attain this, the present invention provides a system and method wherein a pager user can send keypad entries (e.g. pre-programmed commands) from a remote terminal to the pager so that the remote user can enter into a wireless interactive dialogue with the pager to control the operation of the pager, retrieve pages and voice messages therefrom, and/or perform any other pager operation from the remote location. Thus, eliminating the need for the pager user to be in tactile proximity of the pager when retrieving messages.

In one illustrative embodiment, the remote user dials the number of the individual pager from a terminal at a remote location, and sends a pre-programmed command sequence to initiate wireless dialogue with the pager. Then, the remote user sends other given pre-programmed command sequences to allow the user to remotely operate the pager, selectively retrieve messages stored by the pager, selectively delete messages stored by the pager, and terminate the remote operation session, wherein the pager uses digital voice encoding techniques to provide verbal feedback to the remote user.

In another illustrative embodiment, a pager having a respond feature is pre-programmed such that the remote user can send a given respond command from the remote location, thus instructing the pager to send an acknowledgment to the paging system indicating that a given page was received. In yet another illustrative embodiment, the remote user can dial into the telephone network or paging network database to retrieve messages sent to the pager. In any such embodiment, the present invention overcomes the limitations of the prior art.

These and other features of the invention are described in more detail in the following detailed description of the embodiments of the invention when taken with the drawings. The scope of the invention, however, is limited only by the claims appended hereto.

DETAILED DESCRIPTION OF ILLUSTRATIVE EMBODIMENTS OF THE INVENTION

Figure 1:
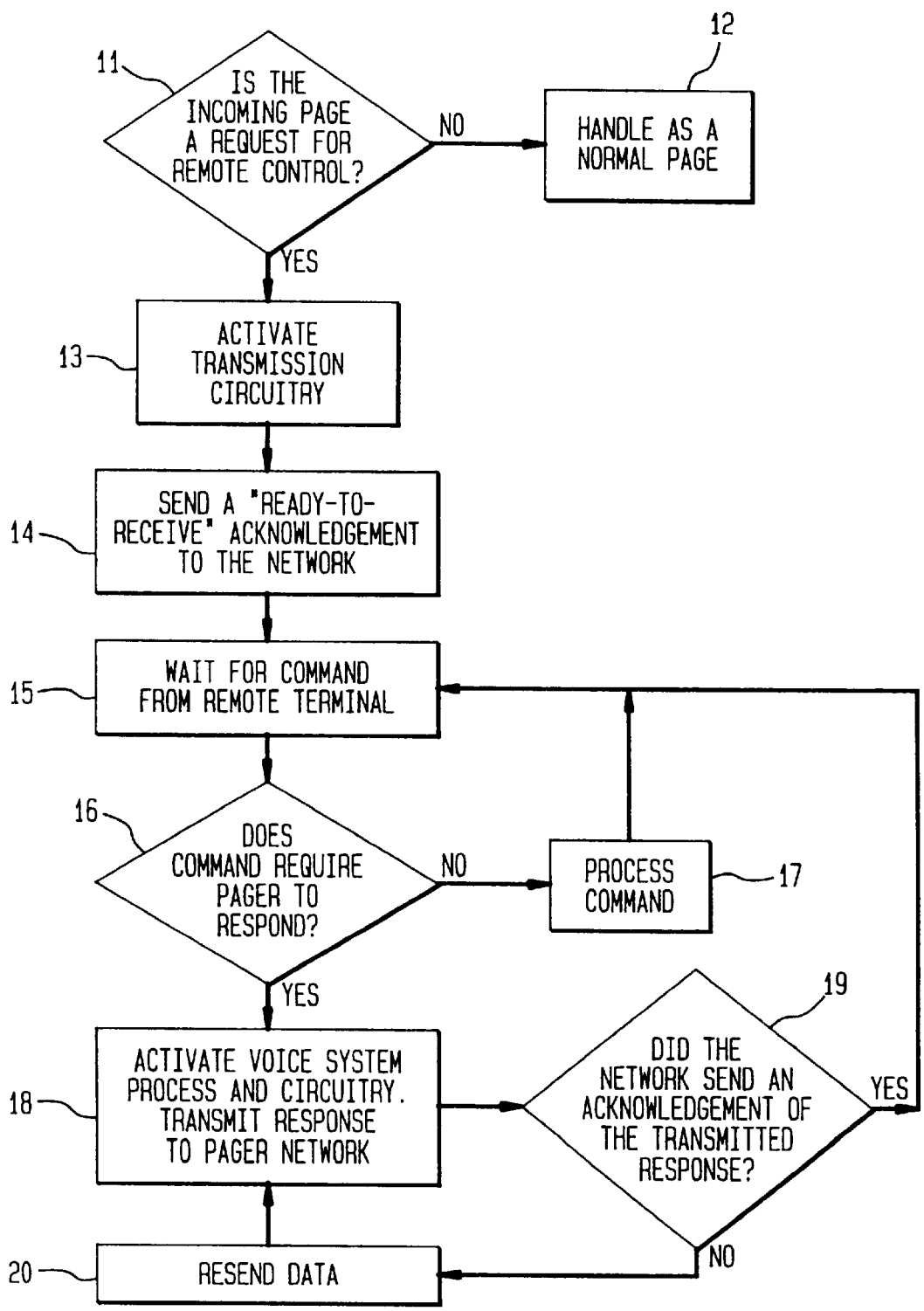
FIG. 1 is a flow chart process diagram showing one illustrative embodiment of a method for remote control of a pager according to the present invention.

Referring now to FIG. 1, there is shown a flow chart diagram of one illustrative embodiment of a method for remote control of a pager according to the present invention, hereinafter referred to as process 10. As shown, at step 11, process 10 first checks the incoming page to determine whether it is a request for remote control or a normal page containing a message for the pager user. If the incoming page is a normal page, then, at step 12, the pager handles the page as such. If, however, the page contains a request for remote control, then, at step 13, the pager activates its transmission circuitry, and sends a "Ready-to-Receive" acknowledgment", at step 14, to the pager network which forwards the acknowledgment to the remote terminal requesting the remote control.

The pager then, at step 15, waits a given duration for a command from the remote terminal. Once a command is received, at step 16, the pager determines whether the command requires the pager to respond. If no response is required, then the pager processes the command, at step 17, and waits for the next command, at step 15. If, however, a pager response is required, then, at step 18, the pager activates voice synthesis circuitry and transmits a response to the pager network which sends the response to the appropriate party (e.g. the remote terminal).

The pager then determines, at step 19, whether the network sent an acknowledgment that the transmitted response was received. If the pager determines that an acknowledgment was sent, then the pager waits for another command at step 15. If, however, an acknowledgment was not sent to the pager, then the pager resends the data at step 20. In any event, once an end remote session command is received, the pager returns to normal operation, at step 11.

As described above, process 10 enables the use of a predetermined command set (e.g. a DTMF command set) to allow a pager user to remotely access their pager through a public switched telephone network (PSTN). As a result, the user can make keypad entries from a remote terminal (e.g. a telephone) to access the pager to retrieve pages, voice messages, and/or perform other pager functions from a remote location. In essence, process 10 enables the pager user to enter into a wireless dialogue with the pager, wherein the pager can use digital voice encoding techniques to provide verbal feedback to the remote user.

Figure 2:
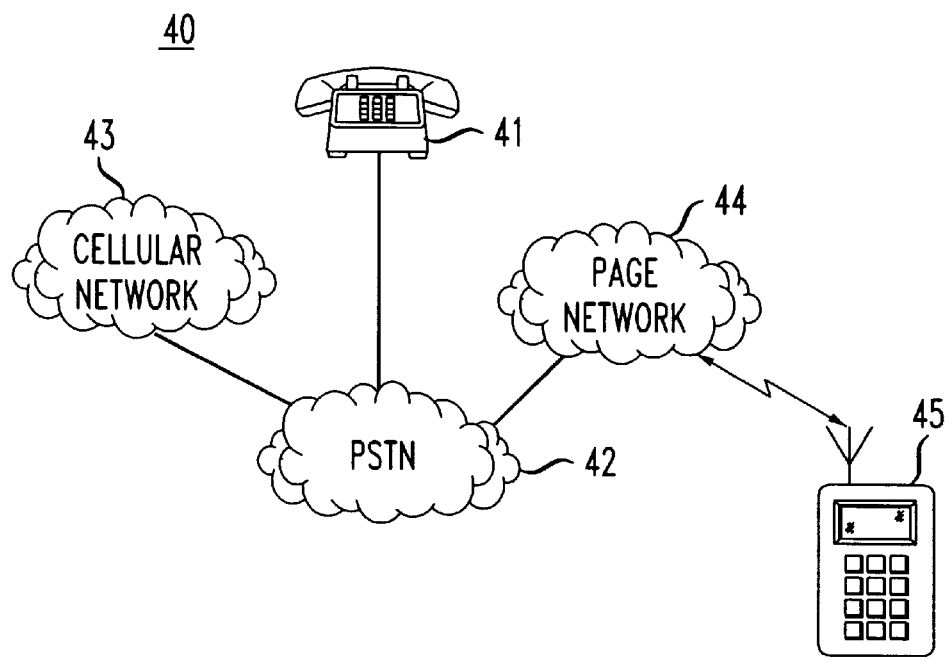
FIG. 2 is a block diagram of one illustrative embodiment of a system for remotely controlling a pager to remotely retrieve messages therefrom, according to the present invention.

In one illustrative embodiment, process 10 may enable a pager user to dial the pager from a remote location, using a terminal on a PSTN. The terminal may comprise a landline telephone, cellular phone, laptop computer, special mobile radio, or any other terminal having access to the PSTN, wherein the PSTN is advantageously connected to the paging network in which the pager communicates. One illustrative embodiment of a system providing the remote terminal operation of a pager is shown in FIG. 2, hereinafter referred to as system 40.

As shown, system 40 has a remote terminal or telephone 41 connected to a PSTN 42 which, in turn, is electrically communicable with cellular network 43 and page network 44 which communicates with pager 45. In operation, a user of pager 45 can use telephone 41 to gain remote control over pager 45 through PSTN 42 and page network 44, and thus operate the pager according to the method of the present invention (e.g. process 10, described above).

In normal paging operation, a user dials a phone number associated with the paging device, and the paging network attempts to send the user message to the paging device via radio communications. Typically, the paging message comprises a numeric, alphanumeric, or voice message. In many pagers, such messages are stored in non-volatile memory which can be easily accessed by the user when in tactile proximity of the paging device. For example, a user may retrieve a stored message by pushing buttons mounted on the outer surface of the pager. Such conventional operation is well known in the art.

In the present invention, however, such pages stored in the paging device can be accessed even when the user is not within tactile proximity of the pager. That is, the stored messages can be accessed without the need to physically press buttons mounted on the pager itself. Instead, the method and system according to the present invention, provide the means for a user to retrieve the stored messages from a remote location.

In an illustrative embodiment, the user can dial the number of the paging device on the terminal keypad followed by a pre-determined keypad sequence, where all keypad entries are communicated to the paging device as DTMF signals modulated on the RF signal used by the paging network. The modulated RF signals are received by the paging device and processed in normal fashion. But, once the pager recognizes that a DTMF signal, requesting remote access or control of the pager, is received, the pager enters a remote control session. In the remote control session, the remote user can control the operation of the pager from a remote location. The pager then locates the nearest pager network receiver and transmits back a response signal acknowledging that the pager is ready to receive user commands. In a typical embodiment, the access of the remote control over the pager may be password protected. In such an embodiment, the pager or the paging network may request a password from the remote user before remote access is enabled. The user would then enter the password sequence, via the terminal keypad, to gain access to remote operation of the paging device.

Figure 3:
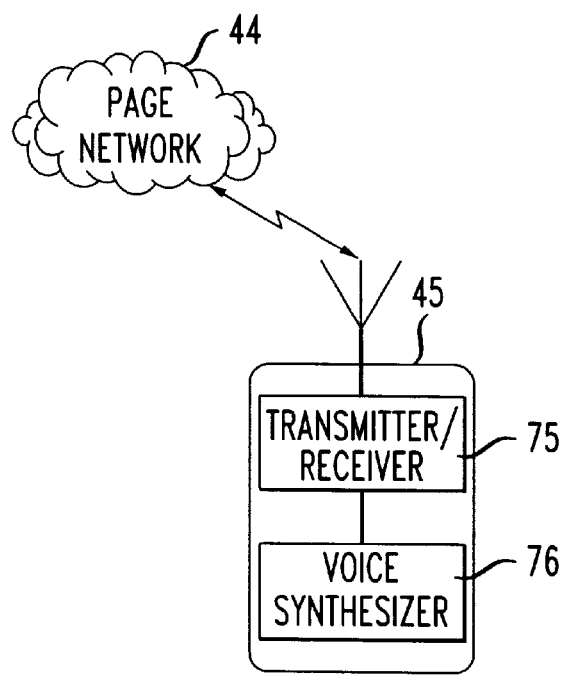
FIG. 3 is a block diagram of an illustrative embodiment of a pager according to aspects of the present invention.

Following the initial access sequence, the user may enter commands, via a remote terminal keypad, to remotely control the operation of the pager as if the pager was in tactile proximity of the user. One user operation is the retrieval of messages sent to and retrieved by the paging device. Once a remote user enters a command instructing the pager to retrieve selected messages, the pager will retrieve the messages from non-volatile memory and transmit the messages, via an RF transmitter (such as transmitter/receiver 75, shown in FIG. 3) and modulated upon an RF carrier, to the paging network which relays the message to the remote user.

When retrieving the messages, the pager controller will activate a voice synthesizer 76 (shown in FIG. 3) to convert a stored message (numeric, alphanumeric, or voice message) into a voice signal, modulated upon the RF carrier, so that the message can be heard by the remote user. In one illustrative embodiment, the paging network has associated RF receiving equipment to downconvert, filter, and demodulate the received RF signal so that the transmitted voice signal can be distributed by the interconnected PSTN. At the end of a typical remote operation session, the user will enter a command sequence to terminate the remote session. Or, alternatively, the paging device can time-out after a predetermined period, if no communication is received from the paging network, thus ending the remote session.

In another illustrative embodiment, the user may leave the paging device a "reach me" number via the keypad at the remote terminal, wherein the pager uses the "reach me" number to call back the remote user, via the paging network and the PSTN, to send the stored messages to the user.

In another illustrative embodiment, the paging network may comprise a message database that stores messages intended for or actually sent to the paging device. This would be useful in obtaining messages that may not have been sent due to the pager being out-of-range, or the pager being turned off. In such a paging system, the remote user dials into the paging network via the PSTN, similar to that described above. The paging network, responding to remote terminal keypad entries initiated by the user, retrieves the messages stored in the database, and transmits the messages to the user with the corresponding conversion to a voice signal usable by the PSTN.

In any such alternate embodiment, the pager may have a feature that enables the remote user to locate the pager when misplaced. For example, the remote user may enter a command instructing the pager to continually beep for a given duration. This would provide the remote user a means for locating the misplaced pager. In addition, the pager may be pre-programmed to accept commands from the remote user to enable the remote user to download information to the pager during the remote session.

There are many other embodiments for providing the remote control of a pager and the remote retrieval of messages sent to the pager, according to the present inventive method and system described herein. As a result, the above description is intended to only provide exemplary embodiments of the many methods and systems for implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

What is claimed is:

1. In a pager configured to communicate with a paging network, a method for responding to a retrieval request for remotely retrieving messages, the method comprising the steps of:

the pager receiving a message from the paging network;

the pager converting the message into a voice signal; and responsive to said retrieval request, the pager transmitting the voice signal to the paging network.

2. The method of claim 1, further including the step of establishing a remote operation session between a remote terminal and the pager, wherein the step of establishing the remote operation session comprises receiving a predetermined command from the remote terminal to initiate dialogue between the pager and the remote terminal.

3. The method of claim 2, wherein the message is stored in a memory of the pager.

4. The method of claim 3, further comprising the step of receiving a given command from the remote terminal to instruct the pager to delete the message stored in the pager.

5. The method of claim 2, further comprising the step of receiving a predetermined stop command from the remote terminal to terminate the remote operation session.

6. The method of claim 2, wherein the command received by the pager to initiate dialogue is selected from a predetermined DTMF command set.

7. The method of claim 1 wherein the message is a message selected from the group consisting of a voice message, a numeric message, and an alphanumeric message.

8. The method of claim 1 wherein the step of transmitting includes transmitting the voice signal from the pager to the paging network via a wireless link.

9. The method of claim 2 wherein said remote terminal is a terminal selected from the group consisting of wireless terminal, landline telephone, cellular phone, laptop computer, and special mobile radio.

10. A pager configured to operate in a wireless pager network, the pager comprising:
   a receiver for receiving a message from the pager network;
   a voice synthesizer for converting the message into a voice signal; and
   a transmitter for transmitting the voice signal to the pager network.

11. The pager of claim 10, wherein the receiver is configured to receive the message wirelessly.

12. The pager of claim 10, further including a memory coupled to the receiver for storing the message.

13. The pager of claim 10, wherein the message is a message selected from the group consisting of a numeric message and an alphanumeric message.

14. The pager of claim 10, wherein the receiver is configured to receive a predetermined command from the pager network, and the voice synthesizer is configured to convert the message into the voice signal responsive to the command.

15. The pager of claim 14, wherein the command is associated with a telephone call by a user of the pager network.

16. The pager of claim 15 wherein the receiver is configured to receive a predetermined command from the pager network, and the transmitter is configured to transmit the voice signal responsive to the command.

17. In a pager, a method comprising the steps of:
   the pager receiving a message from a pager network;
   the pager converting the message into a voice signal; and
   the pager transmitting the voice signal to the pager network.

18. The method of claim 17, wherein the message is a message selected from the group consisting of a numeric message and an alphanumeric message.

19. The method of claim 17, further including the step of receiving a predetermined command from the pager network after the step of receiving the message, wherein the step of converting is performed responsive to receiving the command.

20. The method of claim 19, wherein the command is associated with a telephone call by a user of the pager network.

21. The method of claim 17, further including the steps of:
   the pager receiving a predetermined command from the pager network after the step of receiving the message; and
   the pager transmitting the voice signal to the pager network responsive to receiving the command.

22. The method of claim 21, wherein the command is associated with a telephone call by a user of the pager network.

23. The method of claim 1, wherein the step of converting includes synthesizing the voice signal using a voice synthesizer.

24. The pager of claim 10, wherein the voice synthesizer includes voice synthesis circuitry.

25. The pager of claim 10, wherein the receiver includes receiving circuitry.

26. The method of claim 17, wherein the step of converting includes synthesizing the voice signal using a voice synthesizer.

* * * * *